(12) United States Patent
Thompson et al.

(10) Patent No.: US 9,868,917 B2
(45) Date of Patent: Jan. 16, 2018

(54) MECHANICALLY ENHANCED SEPARATION OF REACTION PRODUCTS IN BIODIESEL PRODUCTION

(71) Applicants: Jeffery Thompson, Cookeville, TN (US); John K. Cooper, Chattanooga, TN (US); Mario A. Oyanader, Cookeville, TN (US)

(72) Inventors: Jeffery Thompson, Cookeville, TN (US); John K. Cooper, Chattanooga, TN (US); Mario A. Oyanader, Cookeville, TN (US)

( * ) Notice: Subject to any disclaimer, the term of this patent is extended or adjusted under 35 U.S.C. 154(b) by 314 days.

(21) Appl. No.: 14/250,775

(22) Filed: Apr. 11, 2014

(65) Prior Publication Data
US 2014/0330033 A1 Nov. 6, 2014

Related U.S. Application Data

(60) Provisional application No. 61/810,942, filed on Apr. 11, 2013, provisional application No. 61/810,948, filed on Apr. 11, 2013.

(51) Int. Cl.
*C11C 3/00* (2006.01)
*C10L 1/02* (2006.01)

(52) U.S. Cl.
CPC ............... *C10L 1/02* (2013.01); *C10L 1/026* (2013.01); *C11C 3/003* (2013.01);
(Continued)

(58) Field of Classification Search
CPC . C10L 1/02; C10L 1/026; C11C 3/003; Y02E 50/13
(Continued)

(56) References Cited

U.S. PATENT DOCUMENTS 1,866,278 A 7/1932 Wallace
5,322,576 A 6/1994 Aitken et al.
(Continued)

OTHER PUBLICATIONS

International Preliminary Report on Patentability and Written Opinion of the International Searching Authority, PCT/US2014/033769 (Thompson).
(Continued)

*Primary Examiner* — Deborah D Carr
(74) *Attorney, Agent, or Firm* — Wayne Edward Ramage; Baker Donelson

(57) ABSTRACT

Apparatus and related methods for reacting a natural oil with a short chain alcohol in the presence of an alkaline catalyst and mesh to produce biodiesel, significantly decreasing the amount of time for the glycerol byproduct to settle out of the reaction mixture. The process for the production of biodiesel includes providing animal or vegetable oil to create a first component, combining a short chain alcohol with a strong base to create a second component, and combining the first and second components together in the presence of a mesh, such that the mesh is in contact with the combined components. The combined compositions represent a reaction mixture that undergo a transesterification reaction and produce fatty acid methyl ester biodiesel and also a glycerol byproduct. The mesh material that is present during the transesterification reaction decreases the amount of time required for the glycerol byproduct to settle out of the reaction mixture.

29 Claims, 5 Drawing Sheets

(52) U.S. Cl.
CPC ... *C10L 2200/0476* (2013.01); *C10L 2290/00* (2013.01); *C10L 2290/141* (2013.01); *Y02E 50/13* (2013.01)

(58) Field of Classification Search
USPC .......................................................... 554/167
See application file for complete search history.

(56) References Cited

U.S. PATENT DOCUMENTS

| | | | |
|---|---|---|---|
| 2007/0158205 A1* | 7/2007 | Balagopal | C04B 35/16 205/413 |
| 2008/0202021 A1 | 8/2008 | Powell | |
| 2009/0038208 A1* | 2/2009 | Despeghel | C10L 1/026 44/308 |

OTHER PUBLICATIONS

International Preliminary Report on Patentability and Written Opinion of the International Searching Authority, PCT/US2014/033883 (Thompson).

* cited by examiner

MECHANICALLY ENHANCED SEPARATION OF REACTION PRODUCTS IN BIODIESEL PRODUCTION

This application claims benefit of and priority to U.S. Provisional Application No. 61/810,942, filed Apr. 11, 2013, by Jeffery Thompson, et al., and U.S. Provisional Application No. 61/810,948, filed Apr. 11, 2013, by Jeffery Thompson, et al., and is entitled to that filing date for priority. The specification, figures and complete disclosures of U.S. Provisional Application Nos. 61/810,942 and 61/810,948 are incorporated herein by specific reference for all purposes.

This invention was made with the support of the Untied States government under National Science Foundation Grant EEC-0908672. The Government has certain rights in this invention.

FIELD OF INVENTION

The present invention relates to methods and apparatuses utilized in the production of biodiesel.

BACKGROUND OF THE INVENTION

The United States' addiction to petroleum based fuels is an ever present environmental problem and an increasingly heavy financial burden. Biofuels are one option that would help reduce the dependency upon petroleum fuels. Biodiesel is a type of biofuel that may provide an alternative fuel source to help replace petroleum fuels. Biodiesel is fuel made up of fatty acid alkyl esters, fatty acid methyl esters (FAME), or long-chain mono alkyl esters. Biodiesel can be made from a large array of fatty acids. The list of available raw materials utilized to produce biodiesel ranges from used cooking oil to liquefied chicken fat.

Biodiesel production is commonly done by transesterification of animal or vegetable oils/fats. Such oils and fats comprise triglyceride esters containing long chain fatty acid moieties. In biodiesel synthesis, such triglycerides are transesterified with short chain alcohols, typically methanol and sometimes ethanol, though other alcohols have been used. The reaction can be carried out in the presence of an acidic or basic catalyst and in general the basic catalysts are faster, with sodium hydroxide or potassium hydroxide being most commonly used. Typically, sodium or potassium hydroxide with a relatively low water level is mixed with the alcohol, for example methanol, and the mixture is then mixed with the oil. Glycerol is a byproduct of the transesterification reaction. After the reaction is complete, a neutralizer is used to remove the catalyst from the product.

Once the transesterification reaction is complete, the glycerol byproduct must be given time to settle out. The amount of time required for the glycerol to settle out of the reaction mixture is one limiting factor in the production of biodiesel that causes problems when trying to produce the fuel on an industrial scale. It takes approximately eight hours for the glycerol byproduct to sufficiently settle out of the reaction mixture, such that a suitable biodiesel fatty acid methyl ester may be retrieved. Other factors, such as the speed of the transesterification reaction itself, also present problems in deriving a biodiesel production technique that is efficient enough for industrial scalability.

In the production of biodiesel, the cost of the oil or grease is the single largest component of production costs. Yellow grease, which is used vegetable oil from the fast-food industry, is much less expensive then soybean oil but has a very limited supply. Yellow grease is estimated to cost roughly $1.55 per gallon in the year 2012-2013 versus $2.80 per gallon for soybean oil. In 2011, the U.S. biodiesel industry reached a milestone by producing over 1 billion gallons of fuel. This is just a small amount compared to the 33 billion gallons of on-highway diesel consumed by the United States annually. In addition, the current price of a gallon of soybean oil is up to three times the cost of diesel fuel. Even though the potential market for the glycerol byproduct offsets some of these costs, it still makes biodiesel less economically feasible in comparison to conventional diesel fuels.

Despite the greater price, there are many reasons that biodiesel should still be developed. One such reason is that the exhaust emissions from biodiesel are significantly lower than those of regular diesel fuel. Another is that when biodiesel is added in a 1-2% amount to regular diesel fuel it can give the fuel better lubricating properties. Thus, biodiesel production is still being considered in the United States and Europe as an alternative fuel.

In biodiesel production plants, generally, the reaction takes place in either a batch reactor or continuously stirred tank reactors. With a batch reactor, a 6:1 ratio of alcohol to triglycerides is used and the reactor is operated at around 65° C. The reaction will take anywhere from twenty minutes to an hour to be complete. In some processes, the batch is left in the reaction vessel to initially settle the biodiesel and glycerol byproduct, while in other processes the batch is pumped into a settling vessel or a centrifuge.

Another way biodiesel is produced in industry is through a continuous process system. A continuous system consists of continuously stirred tank reactors (CSTR) in series. The reaction is carried out normally in a first CSTR; afterwards, the initial glycerol is decanted. After this glycerol is separated out, the reaction in a second CSTR occurs at a faster rate with a greater percent completion. The disadvantage of the continuous system is that there must be enough mixing to sustain a continuous composition throughout the reactor. This means that the dispersion of glycerol in the biodiesel phase is greater and, therefore, it will require more time to settle out of the layer.

After the biodiesel and glycerol are produced in the reactor, they must be separated through a unit operation that speeds up the natural settling of the phases. Centrifuge systems, decanters, and hydrocyclones are most commonly used for this purpose. Decanters rely on density differences between the two phases and residence time to achieve separation. However, the size of the decanter is a function of the residence time. This means that the only way of decreasing time of separation is to increase the size of the decanter, which in turn increases the cost of the process equipment. These systems are usually only used in small batch processes, where the longer residence time is acceptable. Centrifugal systems are mostly used in continuous biodiesel processes. The centrifuge separates biodiesel and glycerol by creating an artificial gravity field by spinning at a high velocity. The centrifuge is used extensively in industries, but is expensive due to initial costs and maintenance. Hydrocyclones are considered to be an effective, but still experimental, method of ester-alcohol separation. The liquid mixture enters the hydrocyclone at a high pressure, and then passes from a wide to narrower section of the inverted cone where the pressure decreases and velocity increases. This causes an increase in gravitational forces, which causes the denser liquid, glycerol, to be accelerated towards the wall while biodiesel, the lighter liquid, is concentrated in the center.

Even though most current separation operations use the difference in densities to separate the phases, there are new technologies that use ultrasonic energy. These ultrasonic processing apparatuses achieve separation by applying ultrasonic energy at two different frequencies to the reactant fluid. The sonic waves transmit through the walls and into the reactants where it accelerates the transesterification and separation processes within the tank. These devices can produce biodiesel at a continuous rate, up to one gallon per minute with a power of 5000 watts. While they do increase reaction and separation times, they do have the disadvantage of being very expensive. As of yet, there are no single ultrasonic processors that can handle enough biodiesel that would be produced in a large production plant. Instead, multiple ultrasonic processors would have to be used, leading to a high initial cost.

Biodiesel production time can be lessened by a variety of techniques, including the aforementioned methods of decreasing the settling time of the glycerol byproduct; however, the techniques currently used in the art also increase the cost of production. The cost to benefit ratio of producing biodiesel has been a primary reason for the lack of commercially produced biodiesel in this country.

If a low cost method were available to decrease the production time associated with the manufacture of biodiesel, then such a method would have a great impact, making the production of biodiesel on an industrial scale commercially viable.

Thus, there is a need in the art for the development of a biodiesel production method that decreases the time of producing the fuel. In particular, methods that decrease the amount of time for the glycerol byproduct to settle out of the reaction mixture are needed. Furthermore, methods of decreasing the settling time of the glycerol byproduct are needed, which do not rely upon expensive machinery such as centrifuges, decanters, and ultrasonic devices, and the energy they require.

SUMMARY OF INVENTION

In various exemplary embodiments, the present invention comprises a method and apparatus for biodiesel production that significantly decreases the amount of time required for the glycerol byproduct to settle out of the reaction mixture. The present methods and apparatuses utilized herein allow for an efficient biodiesel production platform that can be scaled up to an industrial application. Therefore, the methods and apparatuses presented herein fulfill a need in the art of biodiesel production and represent a pathway to producing a commercially viable alternative to petroleum based fuels. The present methods and apparatuses, which are able to decrease the settling time of the glycerol byproduct formed during biodiesel production, are efficient and inexpensive, thus solving a critical need in the art for an inexpensive alternative to costly centrifugal systems.

Thus, in an exemplary embodiment, a process for the production of biodiesel is provided comprising: a) providing animal or vegetable oil to create a first component; b) combining a short chain alcohol with a strong base to create a second component; and c) combining said first and second components together in the presence of a mesh, such that the mesh is in contact with the combined components. The combined compositions represent a reaction mixture that will undergo a transesterification reaction and produce fatty acid methyl ester biodiesel and also a glycerol byproduct. The mesh material that is present during the transesterification reaction decreases the amount of time required for the glycerol byproduct to settle out of the reaction mixture.

In one exemplary embodiment, the first component further comprises a salt (e.g., sodium chloride). The stoichiometric ratio of salt utilized in embodiments of the method can range from 1× to 10×, 1× to 9×, 1× to 8×, 1× to 7×, 1× to 6×, 1× to 5×, 1× to 4×, 1× to 3×, and 1× to 2×. A preferred embodiment of the method utilizes a 3× stoichiometric ratio of sodium chloride as the salt.

The mesh material, in some embodiments, is present in the interior cavity of a batch reactor. In other embodiments, the mesh material is found lining the walls of the batch reactor. In yet other embodiments, the mesh material is incorporated into a stirring mechanism, said stirring mechanism being placed within the batch reactor and providing a means for stirring the reaction components. Thus, the mesh material can be located in any position within the reaction container, so long as the mesh material is in contact with the transesterification reaction components. Those of skill in the art will appreciate the myriad embodiments that can be developed for incorporating a mesh material into a batch reactor. Furthermore, the mesh material may also be incorporated into the interior of a continuous reaction vessel, such as a continuously stirred tank reactor (CSTR).

The mesh material may comprise, in certain embodiments, a metal, a polymer, or both. For instance, some embodiments utilize a nickel mesh material, other embodiments comprise a plastic mesh material, and yet other embodiments utilize a mesh material comprising both nickel and plastic. However, virtually any metal or plastic material may be utilized in the mesh.

The mesh may comprise various sizes and shapes of apertures located within said mesh material. In other words, the mesh apertures may vary in size and shape within a portion of mesh material, or they may be of uniform shape and size. Further, the mesh material itself may be any size and shape.

In particular embodiments, the short chain alcohol used in the method is methanol or ethanol.

In some embodiments, the strong base (alkaline catalyst) is sodium hydroxide (NaOH), and in other embodiments the strong base is potassium hydroxide (KOH). Preferably, the NaOH and KOH are anhydrous.

In some embodiments of the method, the first and second components are each heated to a range of about 50° C. to about 55° C., or about 45° C. to about 60° C., or about 40° C. to about 65° C., before being combined.

In some aspects of the method, after the first and second components are combined, the temperature of the combined reaction mixture is held in a range of about 40° C. to about 65° C., or about 45° C. to about 60° C., or about 50° C. to about 55° C., or about 50° C. to about 60° C., for a duration of about 30 minutes to about 90 minutes, or about 30 minutes to about 120 minutes, or about 40 minutes to about 70 minutes, or in some aspects, the temperature of the combined reaction mixture is maintained continually.

Furthermore, the present disclosure provides a method of reacting a natural oil with a short chain alcohol in the presence of an alkaline catalyst, comprising: providing a natural oil, providing a short chain alcohol, providing an alkaline catalyst, providing a mesh material, and then combining the short chain alcohol with the alkaline catalyst into a composition (a), and subsequently combining composition (a) with the natural oil into a combined reaction mixture, in the presence of the mesh material. The combined compositions represent a reaction mixture that will undergo a transesterification reaction and produce fatty acid methyl ester biodiesel and also a glycerol byproduct. The mesh material is present during the transesterification reaction and is in contact with the reaction mixture.

In some embodiments, the natural oil is vegetable oil, the short chain alcohol is methanol or ethanol, and the alkaline catalyst is sodium hydroxide or potassium hydroxide.

It is a further object of the disclosure to provide a biodiesel produced by the disclosed processes.

In other aspects, the disclosure provides for fatty acid methyl esters produced by the disclosed processes.

In yet other embodiments, a reaction product that is produced by the disclosed processes is provided.

Another object of the disclosure is to provide apparatuses useful for transesterification reactions. In some aspects, these apparatuses comprise batch reactors. In other embodiments, continuously stirred tank reactors (CSTR) are provided. The disclosure provides for the incorporation of a mesh material into said reactors.

Thus, in some embodiments, it is understood that the mesh material located within the interior of a batch reactor, or a continuously stirred tank reactor, may comprise any metal or any plastic, and may also comprise a mixture of any metal or plastic. Preferably, the mesh material is not reactive with the reaction components. In some embodiments, the apparatuses taught herein comprise a nickel mesh within the interior of the reaction vessel.

The apparatuses taught herein, in certain embodiments, include a stirring mechanism. In some embodiments, the stirring mechanism located within the reaction vessel comprises a mesh material, such that the stirring mechanism provides a means for stirring the reaction components and thus exposing the reaction components to the mesh material.

While certain novel features of this disclosure shown and described below are pointed out in the annexed claims, the present disclosure is not intended to be limited to the details specified, since a person of ordinary skill in the relevant art will understand that various omissions, modifications, substitutions, and changes in the forms and details of the disclosure illustrated and in its operation may be made, without departing in any way from the spirit of the present invention. These and other features, aspects, and advantages of embodiments of the present disclosure will become better understood with regard to the following description, claims, and accompanying drawings explained below.

DETAILED DESCRIPTION OF EXEMPLARY EMBODIMENTS

Detailed descriptions of one or more exemplary embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate manner.

The manufacture of biodiesel is a time intensive production process. Finding ways to shorten the production time can greatly impact the feasibility of large scale industrial production. The present methods utilize a nickel mesh apparatus in contact with the reaction components, for example and preferably inside a biodiesel reaction vessel, during the transesterification reaction. In brief, the placement of a nickel mesh inside the reaction vessel (i.e., into contact with the reaction components) during the transesterification reaction leads to a significant decrease in settling time for the glycerol byproduct.

The effect of a nickel mesh on settling time of a glycerol byproduct produced during biodiesel production was evaluated by comparing: (a) a control biodiesel batch that did not utilize a nickel mesh in the reaction container during the transesterification reaction; and (b) an experimental biodiesel batch that did utilize a nickel mesh in the reaction container during the transesterification reaction. The following chemicals were used for the transesterification reaction to yield biodiesel: (1) 500 mL Vegetable Oil; (2) 175 mL Methanol; and (3) 1.5 g Sodium Hydroxide.

The biodiesel reaction is a transesterification reaction which means that an ester and an alcohol are required as reactants in a 6:1 molar ratio of ester to alcohol. Vegetable oil contains triglycerides, which react with methanol to yield biodiesel and glycerol as the products. The sodium hydroxide acts as the catalyst for the reaction.

The procedure for the reaction was as follows:
1. The 500 mL of vegetable oil was heated to 50 degrees Celsius.
2. The sodium hydroxide was crushed, and then added to the 175 mL of methanol and mixed to dissolve the NaOH.
3. The methanol and sodium hydroxide mixture was heated to 50 degrees Celsius.
4. The heated sodium hydroxide and methanol mixture was added to the heated vegetable oil.
5. The reaction occurs preferably in the range of 50-60 degrees Celsius. The reaction must be continued for at least an hour to be considered fully complete, after which the reaction is stopped by removing it from heat, and is then allowed to separate.

For the control batch—which did not utilize a nickel mesh in the reaction container during the transesterification reaction—the products of the transesterification reaction (biodiesel and glycerol) were allowed to naturally separate, and samples for FTIR spectrum testing were taken over the next eight hours after the reaction was considered complete.

Figure 1:
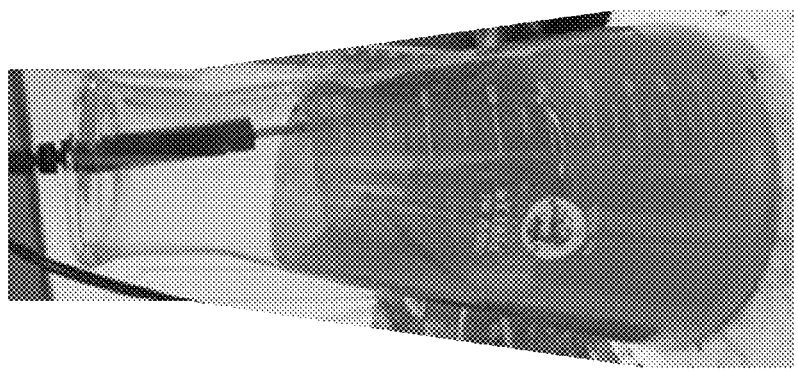
FIG. 1 illustrates the utilization of a nickel mesh in a reaction container during the transesterification reaction.
Figure 1:
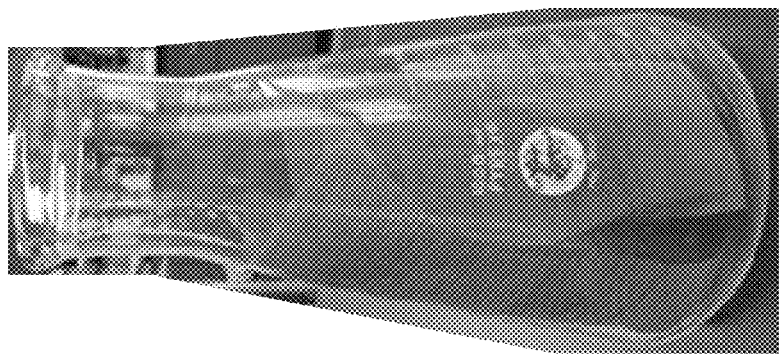

The experimental reaction with the nickel mesh was performed exactly like that of the control batch, but with two square pieces of nickel mesh placed inside the reaction vessel (as seen in FIG. 1). The nickel mesh used is a Ni—Cr alloy that is sourced from McMaster Carr. The diameters of mesh sizes that have been used range from 75 μm to 250 μm. The mesh is purchased in pliable sheets and rolled into a semi-cylindrical shape inside the reactor. The nickel mesh remains in contact with the reaction components during the transesterification reaction and during the separation.

Figure 2:
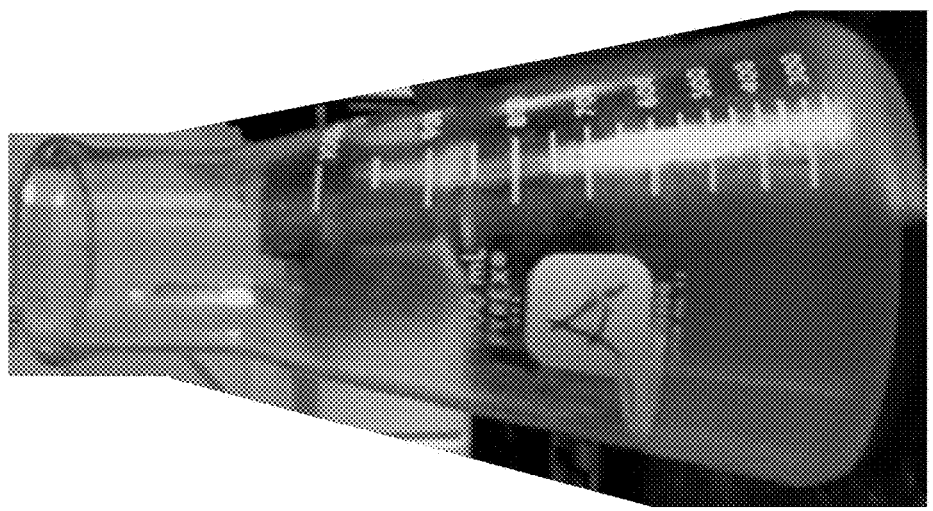
FIG. 2 shows a control reaction mixture (with no nickel mesh) after two days.
Figure 4:
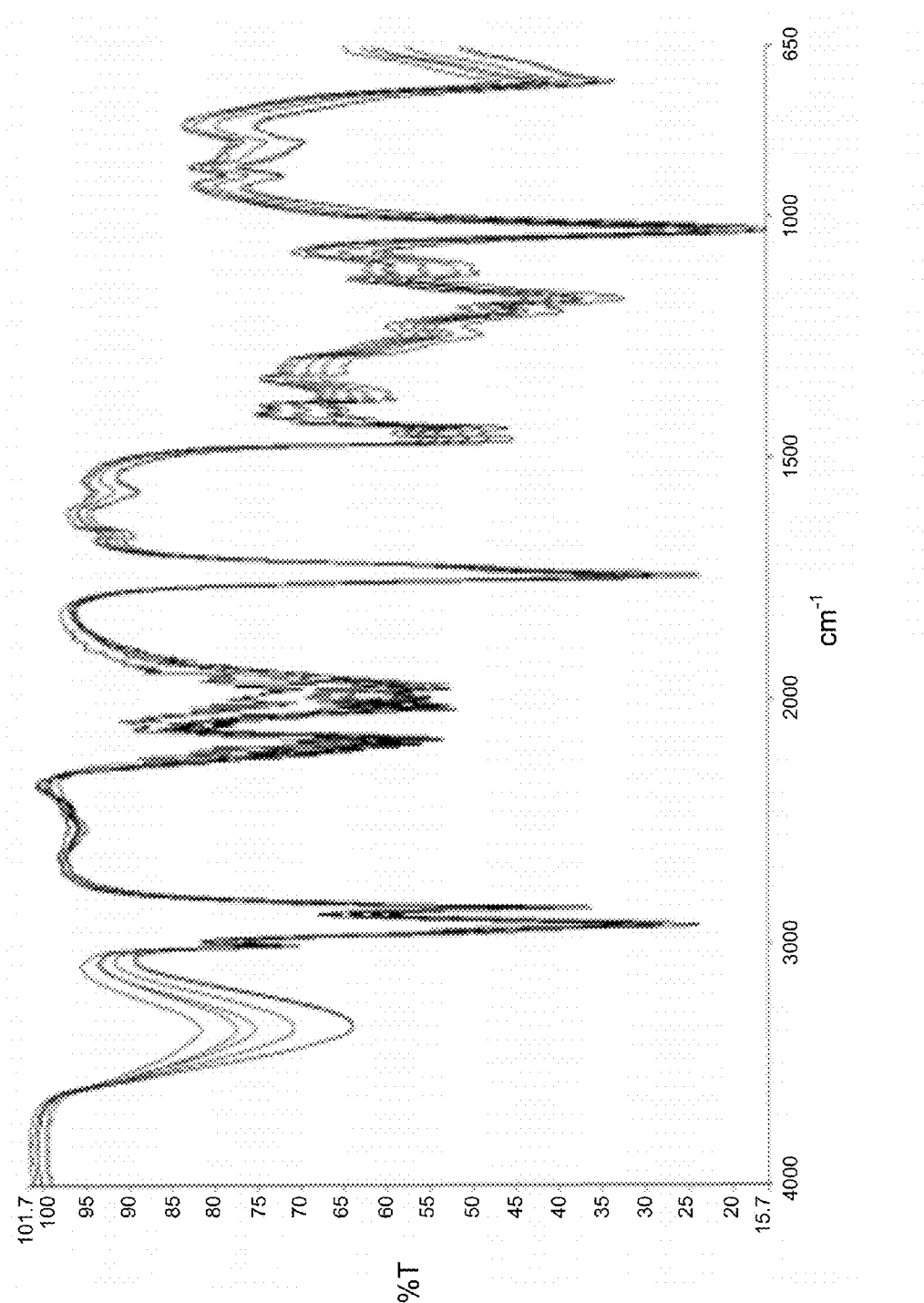
FIG. 4 shows the Fourier-Transform Infrared (FTIR) spectrum for the biodiesel batch shown in FIG. 2, produced without a nickel mesh in the reaction container during the transesterification reaction.

The visual separation of the glycerol byproduct and the fatty acid methyl ester biodiesel layer in the control reaction can be observed in FIG. 2, which shows the control batch two days after removing the reaction from heat. The FTIR results for the control batch are provided in FIG. 4. The FTIR spectrum is presented as wavenumber (cm$^{-1}$) on the x-axis and percent transmittance (% T), or absorbance (Abs), on the y-axis. According to Lambert-Beer law, the absorbance of a sample is linearly related to the concentration in the sample. Therefore, the percent transmittance in the top layer of a biodiesel sample will change with time due to the changing concentration of the alcohol and ester.

For the control batch (FIG. 4), infrared spectroscopy testing was done every hour over an eight hour span after the reaction was completed. The peak of interest in these spectra is the alcohol peak, at X-Y cm$^{-1}$, which changes significantly with time as the glycerol byproduct separates out of the top layer.

Table 1 below illustrates the percent transmittance for the alcohol peak of the control batch (FIGS. 2 & 4) over the eight hour period after the reaction was stopped:

TABLE 1

| Infrared Spectroscopy Data for Biodiesel Batch Produced Without Nickel Mesh | | | | |
|---|---|---|---|---|
| | % T | | | |
| | Time: 10:15 | Time: 15:15 | Time: 16:18 | Time: 18:22 |
| Replicate 1 | 64.421827 | 77.595046 | 81.681761 | 75.513345 |
| Replicate 2 | 64.388834 | 77.597538 | 81.683602 | 75.487403 |

Time: hour:minute

Figure 3:
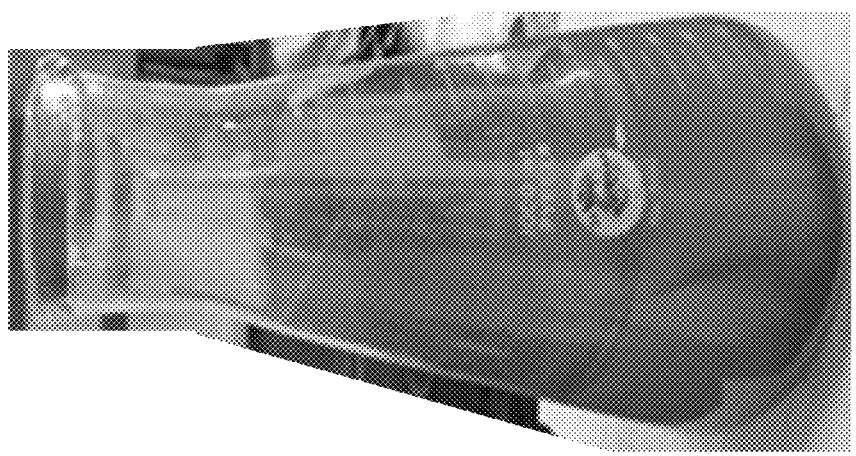
FIG. 3 shows a reaction mixture produced via the utilization of a nickel mesh in the reaction mixture after two days.
Figure 5:
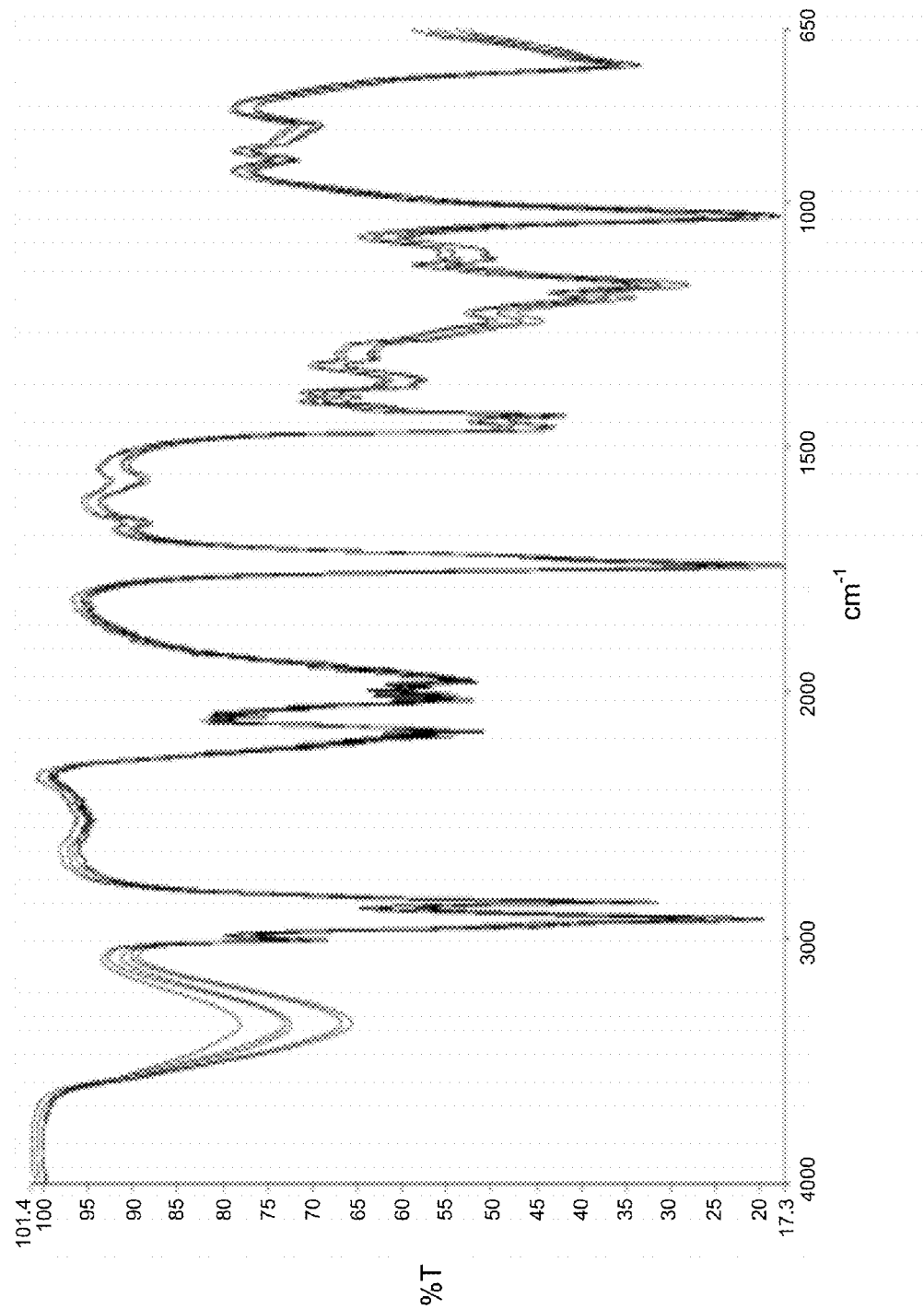
FIG. 5 shows the Fourier-Transform Infrared (FTIR) spectrum for the biodiesel batch shown in FIG. 3, produced with the utilization of a nickel mesh in the reaction container during the transesterification reaction.

The visual separation of the glycerol byproduct and the fatty acid methyl ester biodiesel layer in the experimental reaction containing Ni mesh can be observed in FIG. 3, which shows the biodiesel batch comprising a nickel mesh two days after removing the reaction from heat. The FTIR results for the biodiesel batch produced with nickel mesh are provided in FIG. 5. For the nickel mesh batch (FIG. 5), samples for IR spectroscopy were taken every hour for a three hour span, with an additional test after two days. The peak of interest in these spectra is the alcohol peak (X-Y cm$^{-1}$), which changes significantly with time as the glycerol byproduct separates out of the top layer.

The following Table 2 illustrates the percent transmittance for the alcohol peak over the three hour period and after two days:

TABLE 2

| Infrared Spectroscopy Data for Biodiesel Batch Produced With Nickel Mesh | | | | | |
|---|---|---|---|---|---|
| | % T | | | | |
| | Time: 16:08 | Time: 17:16 | Time: 18:19 | Time: 19:25 | After Two Days |
| Replicate 1 | 65.744318 | 66.893283 | 73.232739 | 78.195219 | 72.538129 |
| Replicate 2 | 65.738042 | 66.903999 | 73.254577 | 78.230625 | 72.574051 |
| Replicate 3 | 65.730737 | 66.921389 | 73.272199 | 78.265443 | 72.612364 |

Time: hour:minute

The difference in settling time between the control biodiesel batch and the biodiesel batch produced with the utilization of a nickel mesh in the reaction container is apparent from comparing the spectral transmittance at the first time point in Tables 1 and 2. The spectral transmittance at this time point in each Table was taken immediately after the respective reaction was completed. The biodiesel batch produced without the nickel mesh had an alcohol peak at around 64.4% transmittance. The biodiesel batch produced with the nickel mesh had an alcohol peak at around 65.7% transmittance. Thus, the biodiesel batch produced with the use of a nickel mesh in the reaction container exhibited a faster settling time of the glycerol byproduct, as there is a smaller concentration of glycerol in the top layer immediately after the transesterification reaction is completed.

Furthermore, consider the time point at 19:25 in Table 2 of the biodiesel batch produced using a nickel mesh, which represents 3 hours post-reaction completion. The spectral transmittance was approximately 78.2%. Compare this spectral transmittance to that observed at the 15:15 time point in Table 1 of the control biodiesel batch, which represents 5 hours post reaction completion. The spectral transmittance was approximately 77.6%. Thus, the utilization of a nickel mesh apparatus in the reaction container, during the production of biodiesel, led to a decrease in the amount of time taken for the glycerol byproduct to settle out of the reaction mixture, as compared with a reaction mixture in which a mesh was not used.

Therefore, the utilization of a nickel mesh in the reaction container during the transesterification reaction leads to significant reduction in the time required for the glycerol byproduct to settle out of the reaction mixture. The disclosed method and the nickel mesh apparatus utilized herein represents an inexpensive and efficient way to speed up the biodiesel production process.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A process for the production of biodiesel, comprising:
   a) providing animal or vegetable oil to create a first component;
   b) combining a short chain alcohol with a strong base to create a second component; and
   c) combining said first and second components together in the presence of a mesh in a reaction vessel, such that the mesh is in contact with the combined components while heat is applied to the combined components.

2. The process of claim 1, wherein the short chain alcohol is methanol or ethanol.

3. The process of claim 1, wherein the strong base is sodium hydroxide or potassium hydroxide.

4. The process of claim 1, wherein the mesh comprises a metal.

5. The process of claim 1, wherein the mesh comprises nickel.

6. The process of claim 1, wherein the mesh comprises a polymer or a plastic.

7. The process of claim 1, wherein the mesh comprises both a metal and a plastic.

8. The process of claim 1, wherein the first and second components are each heated to about 50° C. to about 55° C. before being combined.

9. The process of claim 1, wherein the first and second components are each heated to about 45° C. to about 60° C. before being combined.

10. The process of claim 1, wherein the first and second components are each heated to about 40° C. to about 65° C. before being combined.

11. The process of claim 1, wherein after the first and second components are combined, said combination is heated to about 50° C. to about 60° C., and the temperature is maintained in said range for a duration of about 30 minutes to about 90 minutes.

12. A method of reacting a natural oil with a short chain alcohol in the presence of an alkaline catalyst, comprising:
  i) providing a natural oil;
  ii) providing a short chain alcohol;
  iii) providing an alkaline catalyst;
  iv) providing a mesh material;
  v) combining the short chain alcohol with the alkaline catalyst into a composition (a); and
  vi) combining the composition (a) with the natural oil together in the presence of the mesh material in a reaction vessel while heat is applied.

13. The method of claim 12, wherein the natural oil is vegetable oil.

14. The method of claim 12, wherein the short chain alcohol is methanol.

15. The method of claim 12, wherein the alkaline catalyst is sodium hydroxide.

16. The method of claim 12, wherein the mesh comprises a metal.

17. The method of claim 3, wherein the mesh comprises nickel.

18. The method of claim 12, wherein the mesh comprises a polymer or a plastic.

19. The method of claim 12, wherein the mesh comprises both a metal and a plastic.

20. The method of claim 12, wherein the natural oil and composition (a) are each heated to about 50° C. to about 55° C. before being combined.

21. The method of claim 12, wherein the natural oil and composition (a) are each heated to about 45° C. to about 60° C. before being combined.

22. The method of claim 12, wherein the natural oil and composition (a) are each heated to about 40° C. to about 65° C. before being combined.

23. The method of claim 12, wherein after the natural oil and composition (a) are combined, said combination is heated to about 50° C. to about 60° C., and the temperature is maintained in said range for a duration of about 30 minutes to about 90 minutes.

24. The process of claim 1, wherein two pieces of mesh are introduced to the reactor vessel.

25. The process of claim 1, wherein the mesh is configured to stir the components placed into the reactor vessel.

26. The process of claim 1, wherein the mesh size ranges from 75 µm to 250 µm.

27. The method of claim 12, wherein two pieces of mesh are introduced to the reactor vessel.

28. The method of claim 12, wherein the mesh is configured to stir the components placed into the reactor vessel.

29. The method of claim 12, wherein the mesh size ranges from 75 µm to 250 µm.

* * * * *